3,004,990
DEHYDRATION OF 2,2,6,6-TETRAMETHYLOL-CYCLOHEXANOL
John F. Olin, Dayton, Ohio, assignor to Monsanto Chemical Company, St. Louis, Mo., a corporation of Delaware
No Drawing. Filed Nov. 20, 1959, Ser. No. 854,264
19 Claims. (Cl. 260—345.2)

This invention relates to dehydration processes wherein water is split out from a polyhydroxy compound to form a ring closure. More particularly, this invention relates to an improved process for dehydrating 2,2,6,6-tetramethylolcyclohexanol to form 9-hydroxy-3-oxabicyclo[3.3.1]nonane-1,5-dimethanol.

9 - hydroxy - 3 - oxabicyclo[3.3.1]nonane - 1,5 - dimethanol is a valuable compound which can be oxidized to form polyfunctional acids as disclosed and claimed in my copending application Serial No. 854,265, filed November 20, 1959, for esterification with various organic acids to form esters which are very useful as plasticizers in various synthetic resins as disclosed and claimed in my copending application Serial No. 854,260, filed November 20, 1959. The formation of 9-hydroxy-3-oxabicyclo[3.3.1]nonane-1,5-dimethanol by dehydration of 2,2,6,6-tetramethylolcyclohexanol is known in the art and was first disclosed by Mannich and Brose, Ber. Deutsche, 56, 833 (1923), who passed hydrogen chloride gas into the tetramethylolcyclohexanol at a temperature of 150–160° C. to obtain the 9 - hydroxy - 3-oxabicyclo[3.3.1]nonane - 1,5 - dimethanol in a yield of 56.6%. In addition to the low yields obtained, this process results in the formation of a difficultly separated product because of the presence of dark, resinous material and other side products formed in the reaction.

An object of this invention is to provide an improved process for dehydration of 2,2,6,6-tetramethylolcyclohexanol.

Another object of this invention is to provide an improved dehydration process for dehydrating 2,2,6,6-tetramethylolcyclohexanol to form 9-hydroxy-3-oxabicyclo[3.3.1]nonane-1,5-dimethanol in high yield.

Another object of this invention is to provide a new catalyst for the dehydration of 2,2,6,6-tetramethylolcyclohexanol.

Another object of this invention is to provide new solvents for use in the dehydration of 2,2,6,6-tetramethylolcyclohexanol.

Other objects and advantages of this invention will be apparent to one skilled in the art upon studying this disclosure.

In accordance with the present invention, 2,2,6,6-tetramethylolcyclohexanol is dehydrated azeotropically in the presence of an azeotrope former and a catalyst selected from the group consisting of phosphoric acid, alkanesulfonic acid, and arylsulfonic acid at a temperature of azeotropic distillation to obtain 9-hydroxy-3-oxabicyclo[3.3.1]nonane - 1,5 - dimethanol. In conducting this process, an azeotrope is formed between the water produced in the dehydration and the azeotrope former and the resulting azeotrope distilled from the reaction zone in such a manner that the water is removed from the reaction zone with the azeotrope former being returned thereto. The product, 9-hydroxy-3-oxabicyclo-[3.3.1]nonane-1,5-dimethanol, is readily recovered from the azeotrope former in which it is relatively insoluble by filtration and/or evaporation of the azeotrope former.

Further, in accordance with the present invention, 2,2,6,6-tetramethylolcyclohexanol is dehydrated azeotropically to form 9-hydroxy-3-oxabicyclo[3.3.1]nonane-1,5-dimethanol in high yield by carrying out the azeotropic dehydration in the presence of a solvent of a primary alcohol having from 3 to 6 carbon atoms. The product, 9 - hydroxy - 3 - oxabicyclo[3.3.1]nonane-1,5-dimethanol, is slightly soluble in the solvent and relatively insoluble in the azeotrope former so that the product can be readily separated and recovered by filtration and/or by evaporation of the solvent and azeotrope former. The separation between the product and any unreacted 2,2,6,6-tetramethylolcyclohexanol is readily effected since the latter is very soluble in the solvent and is removed therewith.

The catalyst used in the dehydration process of this invention is one selected from the group consisting of phosphoric acid, alkanesulfonic acids, and arylsulfonic acids. Surprisingly, other acids such as sulfuric acid and oxalic acid are not effective in this dehydration process. The phosphoric acid catalyst can be of any concentration; however, it is preferred to use an acid containing at least 50% phosphoric acid, preferably 85%. If lower concentration phosphoric acid is used, the water present is merely azeotropically distilled from the reaction zone. The alkanesulfonic acid catalysts which can be used in the dehydration process of this invention are preferably the lower alkanesulfonic acids containing from 1 to 4 carbon atoms. Examples of such alkanesulfonic acids include: methanesulfonic acid, ethanesulfonic acid, propanesulfonic acid, and butanesulfonic acid. If desired, a mixture of lower alkanesulfonic acids can be used as a catalyst and such a mixture containing methane, ethane and propanesulfonic acids is commercially available. Ordinarily, the alkanesulfonic acid will comprise from 92 to 95% sulfonic acid, from 1 to 2% sulfuric acid, and from 3 to 6% water. The arylsulfonic acid catalyst which can be used in the process of this invention includes the benzenesulfonic acids, toluenesulfonic acids, and chlorobenzenesulfonic acids, with p-toluenesulfonic acid and 4-chlorobenzenesulfonic acid being preferred.

The azeotrope former is used in the process of this invention to facilitate the removal of the water formed in the dehydration step. In general, the azeotrope former can be any organic compound which forms an azeotrope with water, said azeotrope having a boiling point in the range of from 80° C. to 100° C., and in which the 2,2,6,6-tetramethylolcyclohexanol and the 9-hydroxy - 3 - oxabicyclo[3.3.1]nonane - 1,5 - dimethanol are substantially insoluble. Preferably, the azeotrope former is an aromatic hydrocarbon which may also be an alkylated aromatic hydrocarbon provided there are not more than 4 carbon atoms in all the alkyl groups. Examples of suitable azeotrope formers include: toluene; o-, m-, and p-xylene; ethylbenzene; n-propylbenzene; cumene; 1,2,3-trimethylbenzene; 1,2,4-trimethylbenzene; 1,3,5-trimethylbenzene; 1,2,3,4-tetramethylbenzene; 1,2,3,5-tetramethylbenzene; 1,2,4,5-tetramethylbenzene; and butylbenzene. In addition, other organic compounds such as butyl ether and butyl acetate can also be used as azeotrope formers.

The presence of an alcohol solvent in the reaction zone greatly increases the yield of 9-hydroxy-3-oxabicyclo[3.3.1]nonane-1,5-dimethanol over the yield obtained in the absence of such a solvent. The solvent can be any primary alcohol having from 3 to 6 carbon atoms per molecule and may be either a straight-chain or a branched-chain alcohol. Preferably, the solvent is soluble in water. Examples of suitable solvents include n-propyl alcohol, n-butyl alcohol, isobutyl alcohol, n-amyl alcohol, isoamyl alcohol, n-hexyl alcohol, and isohexyl alcohol. Secondary and tertiary alcohols cannot be used in the dehydration process of this invention. The 2,2,6,6-tetramethylolcyclohexanol is soluble in the above alcohols whereas the 9-hydroxy-3-oxabicyclo-[3.3.1]nonane-1,5-dimethanol product is only partially soluble in the above alcohols, any may be crystallized therefrom under suitable crystallization conditions.

The dehydration reaction is carried out at a temperature corresponding to the azeotropic distillation temperature of the water former and the water produced in the dehydration step. Preferably, the reaction temperature is within the range of from 80° C. to 150° C. When using benzene as an azeotrope former and isobutyl alcohol as a solvent, the reaction temperature will be in the range of from 90° C. to 100° C. In comparison, a reaction temperature of approximately 145° C. is obtained with xylene as the azeotrope former and isoamyl alcohol as the solvent. Preferably, a temperature in the upper part of the 80–150° C. range is used in order to be able to conduct the reaction in a relatively short time; however, temperatures in the lower portion of the range can be used effectively by maintaining reaction conditions for a longer period of time, usually in excess of three hours.

The amount of catalyst present in the reaction zone can be varied over wide limits as determined by the temperature to be used and the reaction time desired. At higher temperatures, the amount of catalyst required in the reaction zone is smaller than when lower temperatures are used. Ordinarily, the amount of catalysts used will be between 1 and 8 percent by weight of the amount of 2,2,6,6-tetramethylolcyclohexanol.

If the dehydration is conducted in the presence of the alcohol solvent, the solvent should be present in the reaction zone in an amount within the range of from 25 to 200 percent by weight of the amount of 2,2,6,6-tetramethylolcyclohexanol to be dehydrated. Smaller or larger amounts of solvent can be used; however, an amount within this range is usually effective in substantially increasing the yield of product obtained.

The amount of azeotrope former present in the reaction zone can be varied over wide limits; however, the azeotrope former is preferably present in an amount by volume less than the amount of solvent present. Usually, the amount of azeotrope former present will be greater than ⅒ the volume of solvent used. If the dehydration is conducted in the absence of the alcohol solvent, the amount of azeotrope former is preferably within the range of from 25 to 200% by weight of the amount of 2,2,6,6-tetramethylolcyclohexanol to be reacted.

The 2,2,6,6-tetramethylolcyclohexanol reactant can be prepared by any of the methods known to those skilled in the art. For example, this reactant can be prepared by the method of Mannich and Brose wherein cyclohexanone and formaldehyde are condensed in the presence of an alkali catalyst. The alkali catalyst, usually calcium oxide or calcium hydroxide, can be removed from the reaction mixture as calcium sulfate by the addition of sulfuric acid or as calcium formate by the addition of formic acid. The reaction involved is as follows:

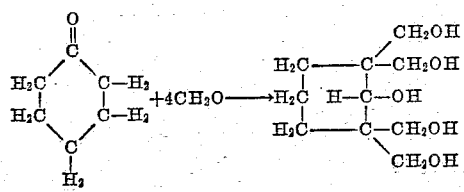

This condensation reaction forms a reaction product which may be in the form of a syrupy liquid. A pure crystalline condensation product may be obtained from the syrupy liquid by evaporation of the solvent water and crystallization from methanol to the free hydroxy compound. However, it is not necessary that the 2,2,6,6-tetramethylolcyclohexanol condensation product be dehydrated in the process of this invention in the form of a pure crystalline compound and the syrupy product obtained in the condensation step can be dehydrated directly without further purification.

The 9-hydroxy-3-oxabicyclo[3.3.1]nonane-1,5-dimethanol product produced in the process of this invention can be represented by the formula:

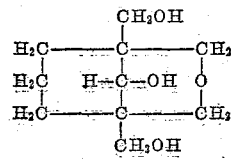

The dehydration product of the present invention, which is usually a light colored solid crystalline material, may be used as humectant in products which require the maintenance of a given moisture level and freshness. Also, this compound may be used to plasticize glue or gelatin for all purposes where a flexible glue or protein composition or film is required. Other uses include use in rubber stampings, copy inks and shoe polishes where the prevention of excessive drying is important. As noted previously, this dehydration product can be oxidized to form various dibasic cyclic acids, as disclosed and claimed in my copending application Serial No. 854,265, filed November 20, 1959. The acids thus produced can be esterified to form new esters which are useful as permanent plasticizers for various synthetic resins, particularly polyvinyl chloride, as disclosed and claimed in my copending application Serial No. 854,260, filed November 20, 1959.

The dehydration process of this invention employing novel catalysts permits the dehydration product to be formed in a reaction mixture from which it can be readily separated by conventional filtration and evaporation procedures. As contrasted with the prior art method of Mannich and Brose using hydrochloric acid gas to effect the dehydration, very little dark colored resinous material is formed in the reaction mixture. Furthermore, the use of the primary alcohol solvent in the reaction zone permits the dehydration product to be recovered in exceedingly high yields, particularly when compared with the yields obtained in the prior art process of Mannich and Brose.

The advantages, desirability and usefulness of the present process in the dehydration of 2,2,6,6-tetramethylolcyclohexanol are well illustrated by the following examples.

*Example 1*

Crude 2,2,6,6-tetramethylolcyclohexanol, which had been prepared by condensing cyclohexanone with formaldehyde in the presence of calcium oxide, was purified by extraction with methanol and evaporated to dryness on a water bath under vacuum to give 480 g. of product for dehydration. The hydration was conducted by heating the 2,2,6,6-tetramethylolcyclohexanol to a temperature in the range of 150–160° C. and passing a brisk stream of dry hydrogen chloride gas through the molten material under continuous stirring for a period of about 15 minutes. A large amount of water was evolved during this treatment and vacuum was applied to remove excess hydrogen chloride gas and water while maintaining the temperature at about 130° C. The tarry residue obtained was extracted twice with 1250 ml. portions of warm water and the insolubles discarded. The aqueous solutions obtained were combined and filtered to remove suspended solid material. The filtrate was then evaporated under vacuum to a volume of about 600 ml. and cooled in a cold chest. Since no crystallization occurred overnight, the cooled filtrate was then evaporated to dryness under vacuum, thereby forming a syrupy mixture of 9-hydroxy-3-oxabicyclo[3.3.1]nonane-1,5-dimethanol.

In order to prove the structure of the compound obtained in the dehydration step, the dehydration product was oxidized to the acid by taking 12 g. of the syrup obtained above, diluting with water to 50 g. and then adding 75 ml. of concentrated nitric acid. This mixture was heated on a water bath at a temperature of 50° C. to form resinous material and to evolve brown fumes after a period of approximately ½ hour. The mixture was continued to be heated at a temperature of from 50 to 60° C. for 3 hours until the resinous material went into solution and the nitrous fumes were no longer evolved. The residue obtained was now evaporated to dryness on a water bath and substantially dissolved in 25 ml. of acetone. The resulting solution was then filtered and 50 ml. of benzene added to the filtrate. Upon cooling for approximately two hours, a sandy, but sticky, precipitate formed in the filtrate. This precipitate was filtered off and washed with benzene before being dried at a temperature of 85° C. under vacuum. The product, which was light tan in color, was purified by crystallization from hot 20% hydrochloric acid and dried in an oven at a temperature of 105° C. to obtain a pale tan powder in an amount of about 6 g. This powder had a melting point of 214–217° C. (uncorrected) as compared with a literature value of 218° C. given by Mannich and Brose, and thus identifying the powder as the dibasic keto acid of 9-hydroxy-3-oxabicyclo[3.3.1]nonane-1,5-dimethanol; i.e., 9-oxo-3-oxabicyclo[3.3.1]nonane-1,5-dicarboxylic acid. A phenyl hydrazone of this tan powder was also prepared and found to have a melting point of 251–2° C. (uncorrected) as compared with a literature value of 251° C.

Example 2

In this example, the dehydration was accomplished using phosphoric acid as the catalyst and xylene as an azeotrope former. The reaction mixture, comprising 400 g. of 2,2,6,6-tetramethylolcyclohexanol, 20 ml. of 85% phosphoric acid, and 20 g. of xylene, was heated with stirring under reflux using a water trap which had been filled with xylene. Water began to come off at a temperature of 130° C. The temperature was raised to 155–165° C. by removing some of the xylene from the reaction mixture. After a period of 1.75 hours, 36 grams of water had been evolved, allowing for the water in the 85% phosphoric acid. The residual xylene in the mixture was then removed by azeotropic distillation with 200 ml. of added water. The water removed in the azeotropic distillation was then replaced to give a total volume of 200 ml. The aqueous solution obtained was filtered through carbon and Super Gel filter aid. The filtrate obtained was chilled, seeded, and placed in a refrigerator overnight to permit the formation of a crystalline precipitate. The crystalline precipitate in the syrupy mass was removed by filtration, washed with 150 ml. of cold acetone, and then washed with 100 ml. of ether. The white, sandy crystals were then dried in an oven at a temperature of 80° C. to yield 66 g. of 9-hydroxy-3-oxabicyclo[3.3.1]nonane-1,5-dimethanol having a melting point of 144–145° C. The filtrate obtained in the filtration step was further treated to yield additional product by evaporation under vacuum followed by the addition of 200 ml. of methyl ethyl ketone and crystallization in a refrigerator. The crystalline material was recovered by filtration, washed twice on the filter with cold methyl ethyl ketone, and oven dried. Recrystallization of this product from water yielded an additional 30 g. of 9-hydroxy-3-oxabicyclo[3.3.1]nonane-1,5-dimethanol having a melting point of 145–6° C.

Example 3

In this example, 2,2,6,6-tetramethylolcyclohexanol was dehydrated using methanesulfonic acid catalyst and dibutyl ether as an azeotrope former. The reaction mixture comprising 50 g. of pure, recrystallized 2,2,6,6-tetramethylolcyclohexanol, 200 g. of dibutyl ether and 1 ml. of methanesulfonic acid was refluxed under a water trap with continuous stirring at a temperature of 138° C. In 15 minutes the calculated amount of water (4 ml.) had separated out. The product was allowed to cool to 100° C. and then diluted with 100 ml. water. After stirring 15 minutes, phase separation was permitted to occur. The dibutyl ether layer was removed from the water layer which was then filtered and evaporated to about 75 ml. Upon standing, large, substantially white crystals of 9 - hydroxy - 3 - oxabicyclo[3.3.1]nonane - 1,5 - dimethanol formed which were separated by filtration, washed twice with diethyl ether, and dried to yield a product having a melting point of 139–142° C.

Example 4

In this example, 200 g,. of 2,2,6,6-tetramethylolcyclohexanol was dehydrated in the presence of 5 g. of p-toluenesulfonic acid monohydrate and 20 g. of xylene. The reaction mixture was refluxed under a water trap with water beginning to be evolved at a temperature of about 130° C. As the reaction proceeded, the temperature rose to 150° C. in 55 minutes when 17 ml. of water had been separated out. The reaction mixture was then cooled to approximately 100° C. and the xylene removed by azeotropic distillation with the addition of 100 ml. of water. After the removal of xylene, additional water was added to the mixture to give a total volume of 100 ml. The aqueous solution was then filtered and reduced in volume by evaporation. Upon cooling, the precipitation of 9-hydroxy-3-oxabicyclo[3.3.1]nonane-1,5-dimethanol occurred. This product was oxidized directly in the solution from which it was crystallized at a temperature of 60° C. for a period of 5 hours to form 97 g. of 9-oxo-3-oxabicyclo[3.3.1]nonane-1,5-dicarboxylic acid which had a melting point of 206–210° C.

Example 5

The substantial improvement in yield to be obtained by the addition of isobutyl alcohol as a solvent to the dehydration reaction mixture is shown in this example. The mixture dehydrated comprises 220 g. (1 mole) of 2,2,6,6-tetramethylolcyclohexanol, 100 g. of benzene, 2 ml. of methanesulfonic acid, and 74 g. (1 mole) of isobutyl alcohol. The reaction mixture was heated with reflux under a water trap at a temperature of approximately 90° C. to 100° C. with the slow evolution of water. After 18 hours, 7 ml. of water had been evolved. At this time, an additional 3 ml. of methanesulfonic acid was added to the reaction mixture and the heating continued for an additional 22 hours at which time 15 ml. of water had been evolved. After the reaction mixture had set for two days without heating, the mixture was again heated for a period of 64 hours with an additional 6 ml. of water being evolved. Then, the reaction mixture was cooled and diluted with 100 ml. of water to effect separation of the benzene and isobutyl alcohol by distillation. Upon cooling the resulting solution, a large amount of crystalline 9-hydroxy-3-oxabicyclo[3.3.1]nonane-1,5-dimethanol was formed. The crystals were separated from the mother liquor and dried to give 120 g. of product having a melting point of 143–5° C. The yield was 63.3%.

Example 6 n-Butyl alcohol was used as a solvent in this example to give almost quantitative yield of 9-hydroxy-3-oxabicyclo[3.3.1]nonane-1,5-dimethanol. The reaction mixture, comprising 110 g. of 2,2,6,6-tetramethylolcyclohexanol, 100 g. of n-butyl alcohol, 2 ml. of methanesulfonic acid and 50 g. of toluene, was refluxed under a water trap at a temperature of 113° C. for a period of 18 hours to separate out 10.75 ml. of water. The reaction mixture was then allowed to cool to permit the formation of a crystalline precipitate. The n-butyl alcohol and toluene were then removed by filtration under vacuum while maintaining the solution at a temperature of 0° C. The crystalline 9-hydroxy-3-oxabicyclo[3.3.1]nonane-1,5-dimethanol was separated from the mother liquor by filtration. Additional product was crystallized from the n-butyl alcohol and toluene previously removed from the crystalline precipitate. The combined product had a melting point of 140–142° C. and weighed approximately 102 g., amounting to a yield of approximately 100%.

*Example 7*

In this example, isoamyl alcohol was used as a solvent to obtain a quantitative yield of the dehydration product. The reaction mixture, comprising 110 g. of 2,2,6,6-tetramethylolcyclohexanol, 100 g. of isoamyl alcohol, 2 ml. of methanesulfonic acid, and 50 g. of xylene, was refluxed under a water trap at an initial temperature of 129° C. which increased to 133° C. at the end of three hours with the evolution of 10 ml. of water. The reaction mixture was then cooled and the isoamyl alcohol and xylene removed by steam distillation. Upon further cooling, 9-hydroxy-3-oxabicyclo[3.3.1]nonane-1,5-dimethanol formed a crystalline precipitate in the remaining solution which was recovered by filtration. The amount of product was 100 g. which is an approximately 100% yield.

Reasonable variation and modification of the invention as described as possible, the essence of which is that there have been provided (1) a process for azeotropically dehydrating 2,2,6,6-tetramethylolcyclohexanol in the presence of an azeotrope former and a catalyst selected from the group consisting of phosphoric acid, alkanesulfonic acid, and arylsulfonic acid to obtain 9-hydroxy-3-oxabicyclo[3.3.1]nonane-1,5-dimethanol, and (2) a process for azeotropically dehydrating 2,2,6,6-tetramethylolcyclohexanol in the presence of an azeotrope former, a primary alcohol solvent, and a catalyst selected from the group consisting of phosphoric acid, alkanesulfonic acid, and arylsulfonic acid to obtain 9-hydroxy-3-oxabicyclo[3.3.1]nonane-1,5-dimethanol.

I claim:

1. A process for dehydrating 2,2,6,6-tetramethylolcyclohexanol to form 9-hydroxy-3-oxabicyclo[3.3.1]nonane-1,5-dimethanol, said process comprising heating said 2,2,6,6-tetramethylolcyclohexanol in the presence of an azeotrope former and a catalyst selected from the group consisting of phosphoric acid, alkanesulfonic acid, and arylsulfonic acid at a temperature of azeotropic distillation and recovering said 9-hydroxy-3-oxabicyclo[3.3.1]nonane-1,5-dimethanol as product of the process.

2. A process of claim 1 wherein said catalyst is phosphoric acid.

3. A process of claim 1 wherein said catalyst is an alkanesulfonic acid.

4. A process of claim 1 wherein said catalyst is an arylsulfonic acid.

5. A process for dehydrating 2,2,6,6-tetramethylolcyclohexanol to form 9-hydroxy-3-oxabicyclo[3.3.1]nonane-1,5-dimethanol, said process comprising azeotropically dehydrating said 2,2,6,6-tetramethylolcyclohexanol in the presence of an azeotrope former, a primary alcohol solvent, and a catalyst selected from the group consisting of phosphoric acid, alkanesulfonic acid, and arylsulfonic acid, at a temperature of azeotropic distillation and recovering said 9-hydroxy-3-oxabicyclo[3.3.1]nonane-1,5-dimethanol in high yield as product of the process.

6. A process of claim 5 wherein said catalyst is phosphoric acid.

7. A process of claim 5 wherein said catalyst is an alkanesulfonic acid.

8. A process of claim 5 wherein said catalyst is an arylsulfonic acid.

9. A process of claim 5 wherein said primary alcohol solvent is selected from the group consisting of n-propyl alcohol, n-butyl alcohol, isobutyl alcohol, n-amyl alcohol, isoamyl alcohol, n-hexyl alcohol, and isohexyl alcohol.

10. A process of claim 9 wherein said primary alcohol solvent is n-butyl alcohol.

11. A process of claim 9 wherein said primary alcohol solvent is isobutyl alcohol.

12. A process of claim 9 wherein said primary alcohol solvent is isoamyl alcohol.

13. A process of claim 5 wherein said temperature of azeotropic distillation is within the range of 80–150° C.

14. A process comprising azeotropically dehydrating 2,2,6,6-tetramethylolcyclohexanol to form 9-hydroxy-3-oxabicyclo[3.3.1]nonane-1,5-dimethanol, said process comprising azeotropically dehydrating said 2,2,6,6-tetramethylolcyclohexanol in the presence of xylene and phosphoric acid at a temperature in the range of 80–150° C. and recovering said 9-hydroxy-3-oxabicyclo[3.3.1]nonane-1,5-dimethanol as product of the process.

15. A process comprising azeotropically dehydrating 2,2,6,6-tetramethylolcyclohexanol to form 9-hydroxy-3-oxabicyclo[3.3.1]nonane-1,5-dimethanol, said process comprising azeotropically dehydrating said 2,2,6,6-tetramethylolcyclohexanol in the presence of dibutyl ether and methanesulfonic acid at a temperature in the range of 80–150° C. and recovering said 9-hydroxy-3-oxabicyclo[3.3.1]nonane-1,5-dimethanol as product of the process.

16. A process comprising azeotropically dehydrating 2,2,6,6-tetramethylolcyclohexanol to form 9-hydroxy-3-oxabicyclo[3.3.1]nonane-1,5-dimethanol, said process comprising azeotropically dehydrating said 2,2,6,6-tetramethylolcyclohexanol in the presence of xylene and p-toluenesulfonic acid at a temperature in the range of 80–150° C. and recovering said 9-hydroxy-3-oxabicyclo[3.3.1]nonane-1,5-dimethanol as product of the process.

17. A process comprising azeotropically dehydrating 2,2,6,6-tetramethylolcyclohexanol to form 9-hydroxy-3-oxabicyclo[3.3.1]nonane-1,5-dimethanol said process comprising azeotropically dehydrating said 2,2,6,6-tetramethylolcyclohexanol in the presence of benzene, methanesulfonic acid, and isobutyl alcohol at a temperature in the range of 80–150° C. and recovering said 9-hydroxy-3-oxabicyclo[3.3.1]nonane-1,5-dimethanol in high yield as product of the process.

18. A process comprising azeotropically dehydrating 2,2,6,6-tetramethylolcyclohexanol to form 9-hydroxy-3-oxabicyclo[3.3.1]nonane-1,5-dimethanol, said process comprising azeotropically dehydrating said 2,2,6,6-tetramethylolcyclohexanol in the presence of toluene, methanesulfonic acid, and n-butyl alcohol at a temperature in the range of 80–150° C. and recovering said 9-hydroxy-3-oxabicyclo[3.3.1]nonane-1,5-dimethanol in high yield as product of the process.

19. A process comprising azeotropically dehydrating 2,2,6,6-tetramethylolcyclohexanol to form 9-hydroxy-3-oxabicyclo[3.3.1]nonane-1,5-dimethanol, said process comprising azeotropically dehydrating said 2,2,6,6-tetramethylolcyclohexanol in the presence of xylene, methanesulfonic acid, and isoamyl alcohol at a temperature in the range of 80–150° C. and recovering said 9-hydroxy-3-oxabicyclo[3.3.1]nonane-1,5-dimethanol in high yield as product of the process.

No references cited